April 10, 1956  A. AMBLI  2,741,507
SPLIT HEADER FOR OPEN TOP TRUCK-TRAILERS AND THE LIKE
Filed July 17, 1952  2 Sheets-Sheet 1
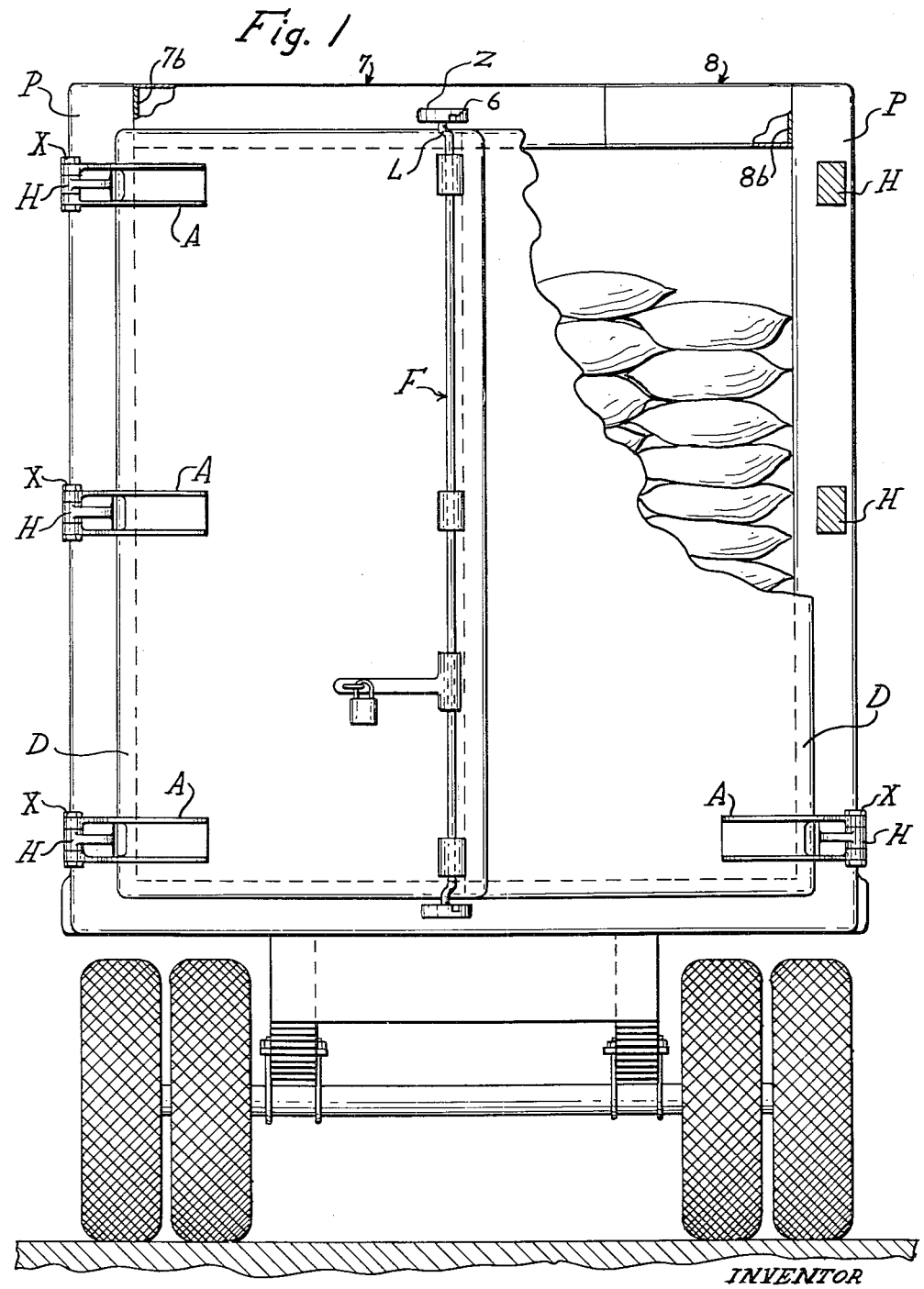
INVENTOR
ANDREW AMBLI
BY Williamson, Williamson
Schroeder & Adams ATTORNEYS April 10, 1956　　　　　　　A. AMBLI　　　　　　　2,741,507
SPLIT HEADER FOR OPEN TOP TRUCK-TRAILERS AND THE LIKE
Filed July 17, 1952　　　　　　　　　　　　　2 Sheets-Sheet 2
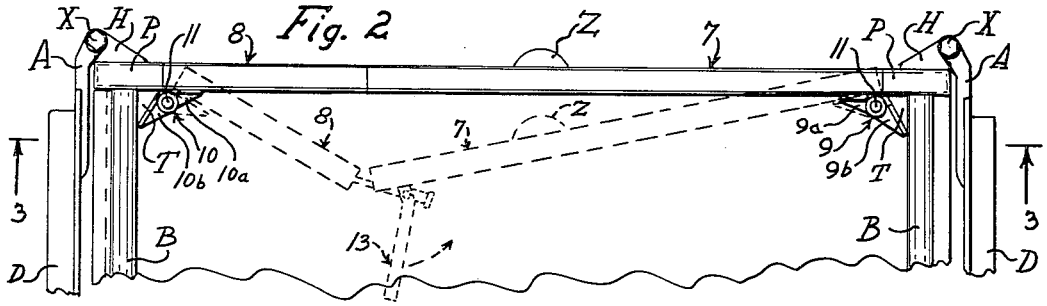
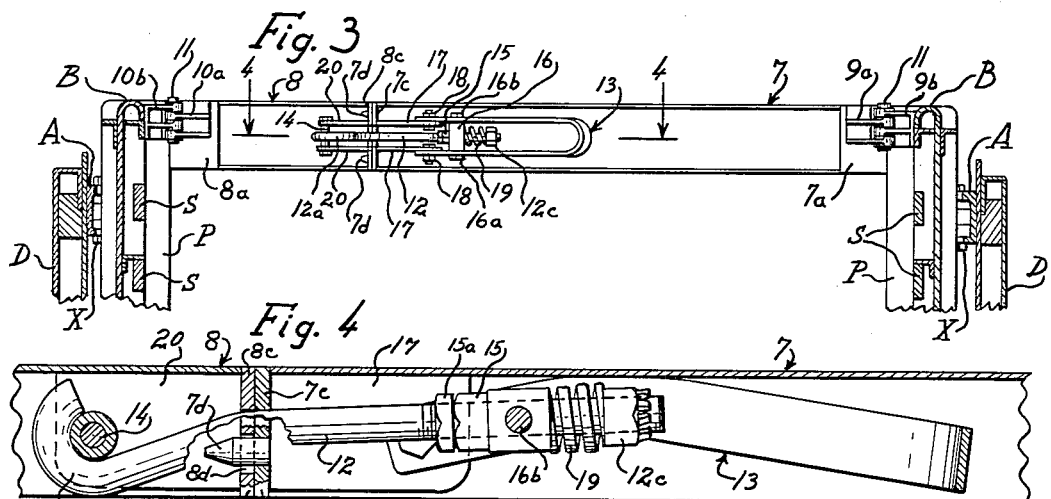
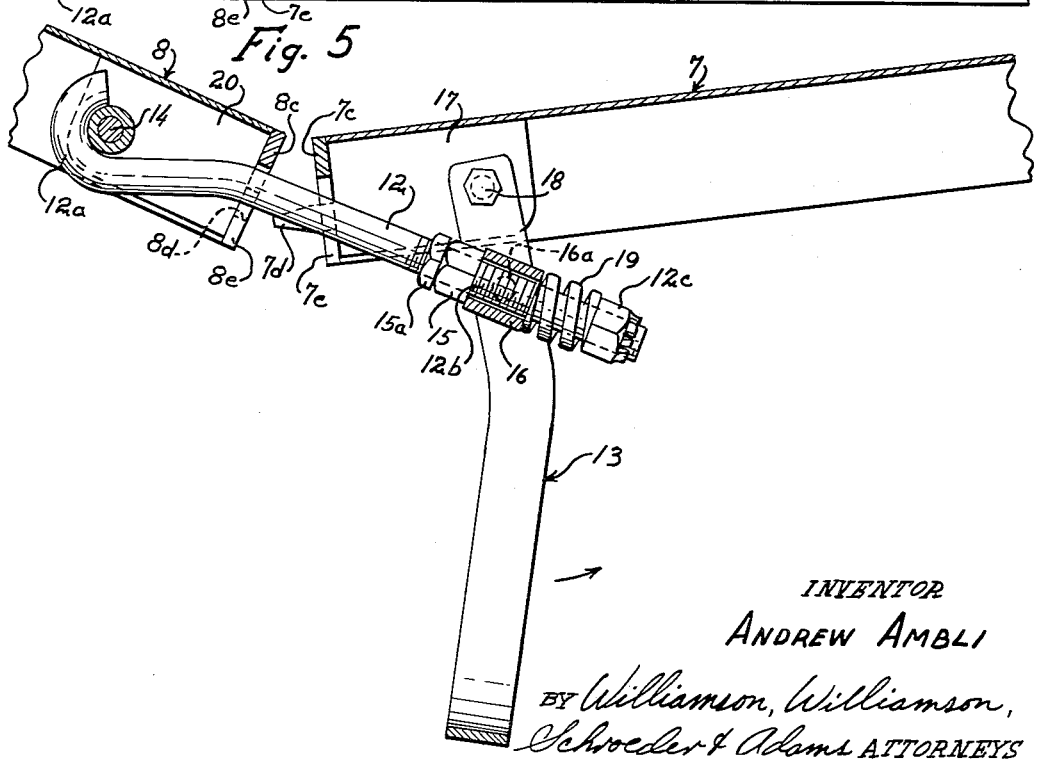
INVENTOR
ANDREW AMBLI
BY Williamson, Williamson,
Schroeder & Adams ATTORNEYS United States Patent Office 2,741,507
Patented Apr. 10, 1956

2,741,507

SPLIT HEADER FOR OPEN TOP TRUCK-TRAILERS AND THE LIKE

Andrew Ambli, Eau Claire, Wis.

Application July 17, 1952, Serial No. 299,443

4 Claims. (Cl. 296—40)

This invention relates to open topped carriers such as large truck-trailers, semi-trailers and cars where the vehicle is loaded through the rear and open top and where a heavy, rigid, transverse header is required to interconnect the upper ends of the rear posts of the sides to reinforce the load carrying structure and to complete and form a suitable rigid frame for the support, mounting and locking of the rear doors of the carrier.

In present open trailer or analogous carrier structure, a heavy, integral header bar is provided, connected to the upper ends of the rear posts by hinge-dowel pins which are exceedingly difficult to replace and reconnect after heavy loading of the carrier or car with the attendant usual spreading apart of the somewhat flexible side walls of the trailer. Oftentimes with the present conventional headers several hours are required on the part of a crew of two or three men to force the upper ends of the door posts together and properly align the header hinges or ends for connecting the dowel pins and securing the header to proper operative position, interconnecting the upper ends of the posts.

It might be further explained that for fast loading of open top trailers and the like, it is usually necessary or desirable to release and remove the header to leave the rear top of the vehicle frame unobstructed.

It is an object of my invention to provide a split but highly rigid header structure for open top carriers which may be readily replaced or repositioned with tensioning effect upon the rear posts of the carrier frame and the replacement and operative positioning of which may be very easily and quickly accomplished by a sole operator, after the trailer has been loaded and even though the sides have sprung outwardly during loading.

A further object is the provision of a very rigid, durable, split header of the class described wherein alignment of the interconnecting ends, locking of said ends and production of a rigid, interconnecting structure is instantly accomplished by draw-lever-action of an over-dead-center locking device, working in cooperation with positive interlocking elements provided at the inner ends of my header sections.

Another object is the provision of a comparatively inexpensive but highly efficient header which may be readily attached to or disconnected from the rear posts of various open type trailers and carriers comprising a pair of interlocked and reinforced sections which for loading, may be readily swung into compact position against the upper sides of the vehicle frame or body.

These and other objects and advantages of my invention will more fully appear from the following description made in connection with the accompanying drawings wherein like reference characters refer to similar parts throughout the several views and in which:

Fig. 1 is a rear elevation of an open top trailer embodying my improved header structure in rigid, locked, operative position and with the rear doors closed and one thereof broken away at its upper portion to show the structure behind the same;

Fig. 2 is a fragmentary top plan view of the same with the dotted lines indicating the positioning of the header sections and pull-lever lock prior to rigidly securing and locking the sections;

Fig. 3 is a cross section taken on the line 3—3 of Fig. 2;

Fig. 4 is a detail view on a larger scale showing the pull lock in secured position with the upper web of the header channel sections removed; and Fig. 5 is a similar view showing the sections in position to be brought into alignment and locked rigidly in operative position by swinging of the pull lever.

As shown in the drawings, my header is embodied in the rear body or frame of a conventional open top truck trailer having the usual upstanding posts P at the rear of the load body or frame to which the usual side slats S are secured as well as the usual top beams B.

In conventional manner, a pair of rectangular, swingable doors D are hinged on pivots or dowels X to suitable hinge brackets H affixed to upper and lower portions of the rear posts P, said doors having elongated hinge arms A as shown which are rigidly welded or otherwise connected to the appropriate rear sides of the doors and terminate at their outer ends in hinge eyes or the like for receiving the dowel pins X. The doors in usual manner are adapted to interfit the rear frame of the carrier body defined by the inner longitudinal edges of the posts P and the inner edge of a header structure, the doors having substantially registering or if desired, overlapping edge relation with suitable lock or fastening devices F for locking the doors in closed position.

The fastening devices F are of conventional stucture and therefore, detailed description is thought unnecessary, it being significant however, that one of the containers or keepers for the locking rod L is supplied by one of the sections of my header structure, as shown comprising a rigid segmental bracket Z affixed to the forward vertical face of the longer header section and having a rod-accommodating slot 6 formed therein in communication with a rod-receiving socket.

My header comprises a pair of heavy, rigid bar sections indicated as entireties by the numerals 7 and 8, said sections being purposely for the advantages hereinafter enumerated, of unequal length and as shown, constructed in the form of relatively wide, shallow construction steel channels with the wide connection web of the channels being preferably disposed vertically and at the rear face of the structure. Both of the sections 7 and 8 preferably at their outer, post-connection ends have means such as the rear, reinforcement plates 7a and 8a respectively for facilitating preferably hinge connection with the upper ends of posts P or rear post portions of the side walls of the trailer body. The outer end of header section 7 is preferably closed and further reinforced by an end plate 7b while the corresponding end of the shorter header section is similarly closed and further reinforced by an end plate 8b (see Fig. 1). The outer ends of header sections 7 and 8 are preferably but not necessarily removably and hingedly connected with the upper ends of posts P through the medium of suitable hinge structures 9 and 10 respectively. As shown, said hinge structures comprise heavy rib hinge straps 10a and 9a respectively, welded or otherwise rigidly connected to the rear reinforcing plates 7a and 8a and having pintle-receiving eyes aligned for reception of heavy, removable hinge pintles 11 which interconnect the ribbed post-hinge straps 9b and 10b for the two sections. The straps 9b and 10b are welded or otherwise rigidly attached to triangular post reinforcements T (see Fig. 2) which may be welded to the top portions of posts P and the interconnecting portions of the side walls of the trailer body. With such hinge connections 9 and 10, it will readily be seen that in loading, the header sections 7 and 8 may be swung rearwardly and inwardly into collapsed position against the side walls of the trailer body.

The rigid channel sections 7 and 8 at their inner ends are provided as shown, with cooperating end abutment plates 7c and 8c respectively, said plates covering the extremities of the channel members and being welded or otherwise rigidly affixed thereto. One of said abutment plates as shown, plate 7c of the longer header section, rigidly carries a pair of projecting locking pins 7d which project longitudinally from the inner end and are adapted to be accommodated and interlocked in enlarged pin-receiving recesses 8d (see Figs. 3 and 4) of the cooperating abutment plate 8c.

I provide a readily operable and efficient mechanism between the inner ends of the header sections for drawing or pulling said ends together while simultaneously aligning and locking the two sections into a very rigid, substantially integral structure. This mechanism as shown, includes a draw hook 12 having an elongated shank which is swingably connected between the legs of an over-dead-center draw lever 13 of elongated U-shaped form. Draw hook 12 has the hook extremity 12a at its end projected from the inner end of header section 7 shaped to snugly engage a short vertical post or other suitable hook engagement element 14 rigidly affixed within the channel of header section 8 at a short distance from the cooperating abutment plate 8c, said post being reinforced and secured as shown, within said channel by a pair of rigid plates 20 which are welded to the front web and abutment plate 8c of the channel member. At least a portion 12b of the shank of draw hook 12 is exteriorly threaded to receive an adjustment nut 15 and a cooperating lock nut 15a and said threaded portion of the shank is slidably received in a bore or accommodating passage 16a drilled transversely through a connector block 16 which is interposed between the legs of the looped or U-shaped draw lever 13 at a point spaced a short distance outwardly of the pivotal bolt connection of draw lever 13 with spaced supporting plates 17 welded within the channel at the end portion of header section 7. Pivoted connection of the draw lever 13 as shown, is made by nutted bolts 18 (see Figs. 3 and 5), said bolts as shown, being disposed intermediately of the rear and front sides of channel member 7 and sufficiently rearward of the front face of said channel and header section to position the pivotal mounting screws 16b for the connector block 16 inwardly of post 18 in an over-dead-center relation when the lever 13 is swung to closed, locked position. A heavy coil expansion spring 19 as shown, is interposed between the rear side of connector block 16 and a fixed abutment nut 12c secured near the extremity of the shank of hook 12. The horizontal, central portions of cooperating abutment plates 7c and 8c are slotted at 7e and 8e respectively, said slots being of equal width to the space between the corresponding attachment plates 17 and 15 respectively (see Figs. 3 to 5 inclusive), said slots accommodating the outer portion of the shank of draw hook 12.

Operation

In use, the header sections 7 and 8 disconnected by disengaging the hook 12 from the retaining post 14 are usually swung inwardly and forwardly against the sides of the body for loading the trailer. If desired to provide even additional room at the top of the side walls for receiving a full load, the header sections 7 and 8 may be entirely removed from the trailer by pulling the dowel pins 11 of the hinge connections 9 and 10. The body is then loaded usually from directly above the trailer and in the course of fully loading the body, as is usual, the side walls often spread outwardly apart due to inherent flexibility of the connections thereof with the chassis.

When the body is fully loaded, the header sections 7 and 8 are again hingedly connected with posts P if they have been removed and are swung or otherwise positioned in substantial or near alignment with the abutment ends 7e and 8e, then being spaced a short distance apart.

With the draw lever 13 swung outwardly in the position shown in Fig. 5, the hooked end 12a of the draw hook is then engaged about post 14 and the draw lever is then swung into its over-dead-center position against the rear face of the channel section 7, being then confined within the longitudinal recess provided by that channel.

In this operation, it will be noted that a very powerful pull is imparted between sections 7 and 8 to draw the abutment ends of said sections together and to simultaneously align and interengage the tapered lock pins 7d with the enlarged pin-receiving apertures 8d of the cooperating abutment plate 8c. Such alignment of locking pins, abutment of the inner ends of the header sections and pull is all simultaneously effected by the swinging of draw lever 13 from open to closed and locked position. In such swinging action, a limited resilient give or lost motion is effected by the interposition of the heavy, short contractile spring interposed between the terminal of shank 12b and the connector block 16. The action of the draw lever of course pulls the upper ends of the posts P and sides of the body together the requisite distance to provide for rigid interlocking of the two header sections and the proper reinforcement of the trailer body at the rear completing the rigid rectangular frame for receiving the hinged doors D. Doors D may then be swung to closed, interrelated position, as shown in Fig. 1 and the fastening devices F secured and tightened to lock the trailer doors.

The section 8 is purposely constructed much shorter than the section 7 to give the doors rigidity at the vertical center of the rear of the trailer and to further enable a driver or operator from the right hand side of the trailer to readily reach in and swing the draw lever 13.

From the foregoing description, it will be seen that I have provided a simple, highly efficient split header for open topped carriers which may be readily disconnected or connected and by which the rear portions of the trailer walls may be appropriately drawn together with provision of adequate power for securing the header in operative-reinforcing and door-frame-forming position.

My structure may be readily installed and operated by the driver of the vehicle without requiring outside power means for positioning the header and drawing in the rear posts of the body.

It will of course, be understood that various changes may be made in the form, details, arrangement and proportions of the parts without departing from the scope of my invention.

What I claim is:

1. Header construction for the rear end of an open-top trailer or the like of the type having side walls capable of spreading during loading, said walls terminating at their rear ends in upstanding post portions, said header construction comprising two cooperating, rigid header sections having cooperating inner abutment ends and provided with means at their outer ends for connection with the upper ends of said post portions of said walls, a locking pin projecting from the abutment end of one section, and the abutment end of the second section having a pin-accommodating seat for receiving and interlocking with said pin, a draw hook mounted on the inner end portion of one of said sections, a hook-engagement element adjacent the inner end of the other header section for detachable connection with said hook and mechanism for exerting powerful pulling action upon said hook in the direction of the outer end of said hook-carrying section and for also retaining said draw hook and sections in locked position.

2. The structure set forth in claim 1, and said mechanism constituting an over-dear-center draw lever pivoted at one end to one of said sections adjacent the inner end of said section and having connection with said hook at a point disposed outwardly of its pivoted connection with said section.

3. Split header construction for the rear end of an open-top trailer or the like of the type having side walls capable of spreading during loading, said walls terminating at their rear ends in upstanding post portions, said header construction comprising two independent, cooperating and longitudinally alignable, rigid header sections having cooperating inner abutment ends, hinge mechanism at the outer end of each of said sections for swingably securing the respective sections to the upper ends of said post portions, such hinge mechanisms having vertical axes offset inwardly from the ends of said connected header section and a lever-actuated take-up device interconnecting the inner ends of two header sections and providing for limited inward relative swinging of the inner heads of said header sections into oblique angle formations with the outer ends of said header sections then swung inwardly some distance away from said post portions, said take-up mechanism serving also to swing said header sections outwardly into horizontally aligned, locked position with the inner ends in abutment and thereby, through the offset connection of said sections with said hinge mechanism, serving to put tension upon said two post portions with application of power in the manner of a toggle.

4. The structure set forth in claim 3 wherein the two sections of said header construction are of substantially different lengths, totaling when longitudinally abutted and aligned, the normal horizontal distance between said upstanding post portions, said sections being of forwardly facing channel construction and serving to house said mechanism for detachably interlocking said inner end portions of said sections and for pulling said sections together.

References Cited in the file of this patent

UNITED STATES PATENTS

| | | |
|---|---|---|
| 493,838 | Potter | Mar. 21, 1893 |
| 966,426 | Carlson | Aug. 9, 1910 |
| 1,972,346 | Juline | Sept. 4, 1934 |
| 2,371,497 | Black | Mar. 13, 1945 |
| 2,450,589 | Falk et al. | Oct. 5, 1948 |
| 2,603,382 | Kojan | July 15, 1952 |
| 2,605,123 | Claud-Mantle | July 29, 1952 |